Oct. 8, 1929.   A. NELSON   1,730,742
COWL FOR PROPELLER HUBS
Filed Dec. 12, 1928
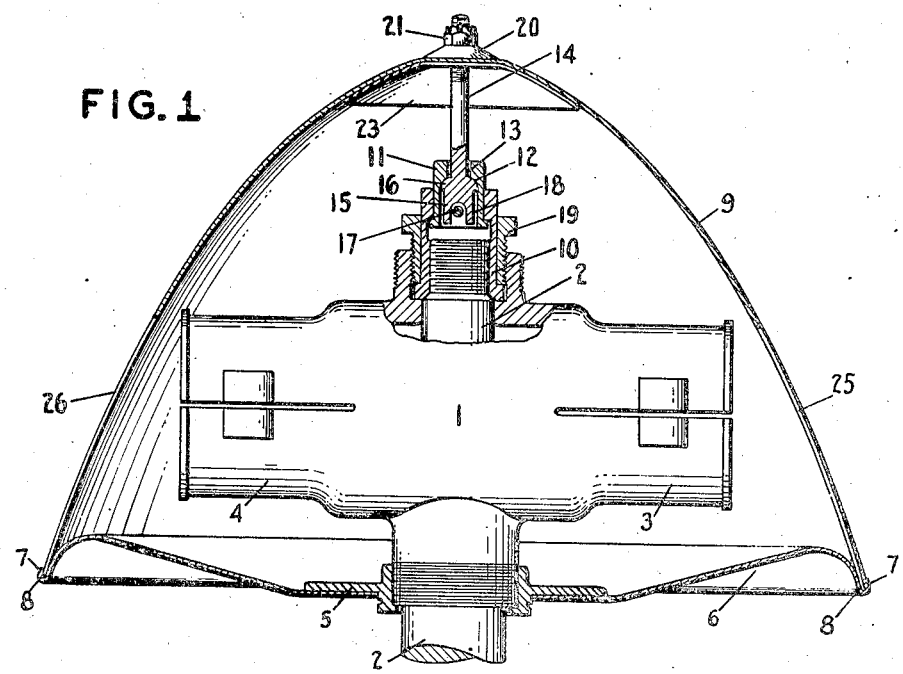
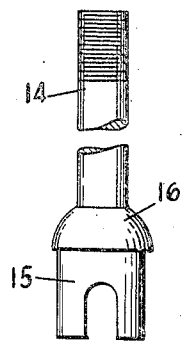
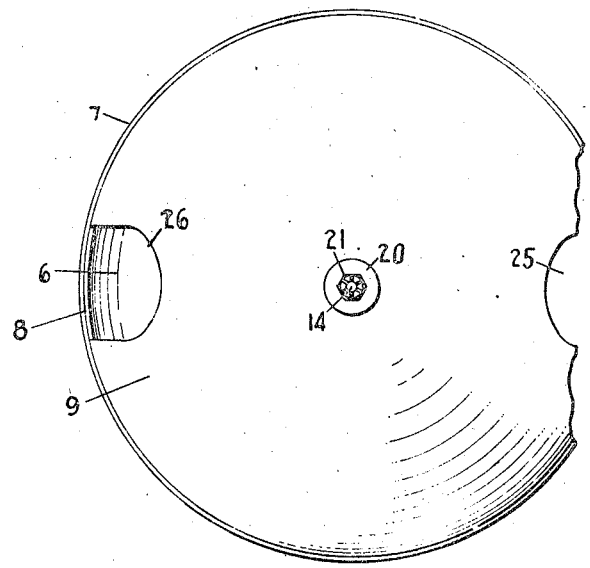
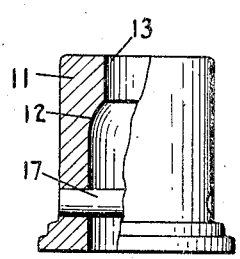
INVENTOR
ARVID NELSON
BY Dodson & Roe
ATTORNEYS Patented Oct. 8, 1929

1,730,742

UNITED STATES PATENT OFFICE

ARVID NELSON, OF MILWAUKEE, WISCONSIN, ASSIGNOR TO HAMILTON AERO MANUFACTURING COMPANY, OF MILWAUKEE, WISCONSIN

COWL FOR PROPELLER HUBS

Application filed December 12, 1928. Serial No. 325,489.

My invention relates to those devices called spinners, which are employed in air craft to cover the hub and end of the engine shaft. Practice has shown that the centrifugal force tends to throw out the inner edges of the spinners; this loosens the bolt which secures them in place, with disastrous results. Moreover, when the bolt is tight, it crystallizes in a short time in use and breaks off, with equally dangerous results.

My invention has for its object, to provide a construction by which the centrifugal force may be utilized to hold the edge of the spinner more firmly in place, and provide securing means which shall be universally jointed, thus eliminating to a great extent the danger of crystallization.

My means of accomplishing the foregoing object may be more readily understood by having reference to the accompanying drawings, which are hereto annexed and are a part of this specification, in which—

Fig. 1 is a view, partly in section and partly in elevation, showing my improved spinner and securing means;

Fig. 2 is a front elevation; and

Figs. 3 and 4 are detail views of the securing means.

Similar reference numerals refer to similar parts throughout the entire description.

As shown in the drawings, the propeller hub 1 is mounted upon an engine shaft 2, only a fragmentary portion of which is shown. The hub 1 is shown with two arms, 3 and 4, which project radially and are adapted to receive the shanks of the propeller blades (not shown). On the inner portion of the hub I secure a flange 5, to which is secured a base plate 6. This base plate 6 has a circumferential flange 7, which provides a space 8, the purpose of which will be explained later.

A conoidal spinner 9, which has two openings, 25 and 26, through which the propeller blade shanks may pass, is constructed with its base of the same diameter as the flange 7. The openings 25 and 26 permit the compression of the spinner base so that it is possible to snap it into the space 8, the resilience of the metal holding it normally in place, this being augmented by the centrifugal force when the propeller is rotating. At the same time the base of the spinner 9 is prevented from being distorted by the centrifugal force, by means of the flange 7 on the base plate 6.

On the forward end of the hub 1 is mounted a bushing 19, which carries a sleeve 10 threaded upon the shaft 2. Inside this sleeve 10 I mount a cap 11, which has a concave internal shoulder 12 and a central opening 13. A bolt 14 passes through this opening 13. This bolt 14 has a bifurcated head 15, the upper portion 16 of which is convex and is fitted to the concave shoulder 12.

The bifurcated portion of the head 15 straddles a pin 17 fixedly mounted in the cap 11, thus preventing the rotation of the bolt 14 though permitting its movement. An annular space 18 is provided intermediate the head 15 and the inner wall of the cap 11. The outer end of the bolt 14 is threaded, a washer 20 is fitted thereto and engages the spinner 9. A butt 21 serves, when tightened, to hold the base of the spinner 9 in the space 8 formed by the flange 7 on the base plate 6. It may be found desirable in practice to provide a reinforcement 23 at the tip of the spinner 9 adjacent the place where the bolt 14 passes through it.

It will be apparent from the foregoing description that I have provided for a universal movement of the bolt 14, thus effectually avoiding the tendency to crystallize due to bending strain, and yet it serves to hold the spinner 9 tightly against the base plate 6.

Having described my invention, what I regard as new, and desire to secure by Letters Patent of the United States, is:

1. A cowl for propeller hubs, comprising a base plate secured to the hub, a circumferential flange on said plate, a conoidal spinner, the base of which snaps into said flange, a center bolt to hold said spinner in place, and a universal joint secured to said hub and said bolt.

2. The combination, with a propeller hub, of a base plate mounted intermediate the engine and the hub, a conoidal spinner, having openings therein for the shanks of the propeller blades, a circular flange on said base plate into which said spinner snaps, securing means to hold said spinner in place, and a universal joint in said means.

3. The combination, with a propeller hub, of a base plate mounted intermediate the engine and the hub, a conoidal spinner, having openings therein for the shanks of the propeller blades, a circular flange on said base plate into which said spinner snaps, a threaded bushing secured to the front of the hub, a sleeve fitted therein, a peripheral flange thereon which engages the said bushing, a cap mounted in said sleeve, said cap having a concave internal shoulder, a bolt having a bifurcated head which straddles a pin fixedly mounted in said cap, the outside of said head being convex to fit said concave shoulder, a thread on said bolt, and a nut and washer thereon to draw said spinner against said base plate.

4. A cowl for propeller hubs, comprising a spinner which encloses said hub, and universally jointed means to hold said spinner in place.

5. A cowl for propeller hubs, comprising a base plate secured to the hub, a circumferential flange on said plate, a conoidal spinner, the base of which snaps into said flange, and universally jointed means to hold said spinner in place.

6. A cowl for propeller hubs, comprising a base plate, a circumferential flange on said plate, a conoidal spinner, the base of which snaps into said flange, and universally jointed means to hold said spinner in place.

ARVID NELSON.